United States Patent
Yang et al.

(10) Patent No.: US 7,233,361 B2
(45) Date of Patent: Jun. 19, 2007

(54) APPARATUS FOR AND METHOD OF DETECTING WHETHER INCOMING IMAGE SIGNAL IS IN FILM MODE

(75) Inventors: Seung-joon Yang, Suwon (KR); Young-ho Lee, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 426 days.

(21) Appl. No.: 10/438,210

(22) Filed: May 15, 2003

(65) Prior Publication Data

US 2004/0008275 A1    Jan. 15, 2004

(30) Foreign Application Priority Data

Jul. 13, 2002    (KR) ............................ 2002-0041021

(51) Int. Cl.
*H04N 7/01* (2006.01)
*H04N 5/46* (2006.01)

(52) U.S. Cl. ...................... 348/441; 348/558; 348/452

(58) Field of Classification Search ................ 348/441, 348/452, 443, 459, 699, 700, 701, 558; H04N 7/01, H04N 5/46
See application file for complete search history.

(56) References Cited

U.S. PATENT DOCUMENTS

| | | | |
|---|---|---|---|
| 4,731,651 A | 3/1988 | Matsumoto et al. | |
| 5,111,511 A | 5/1992 | Ishii et al. | |
| 5,153,719 A | 10/1992 | Ibenthal | |
| 5,398,071 A | 3/1995 | Gove et al. | |
| 5,400,083 A | 3/1995 | Mizusawa | |
| 5,568,196 A | 10/1996 | Hamada et al. | |
| 5,796,437 A | 8/1998 | Muraji et al. | |
| 5,844,630 A | 12/1998 | Yamauchi | |

(Continued)

FOREIGN PATENT DOCUMENTS

EP    0 883 298 A2    12/1998

(Continued)

OTHER PUBLICATIONS

Translation of JP 2002-016944 (Detailed Description part).*

(Continued)

*Primary Examiner*—Sherrie Hsia
(74) *Attorney, Agent, or Firm*—Staas & Halsey LLP

(57) ABSTRACT

An apparatus for detecting whether an image signal is in a film mode, includes a first field buffer, a second field buffer and a third field buffer that sequentially buffer respective fields of the image signal by order of input, using the respective fields stored in the first, the second and the third field buffers. The apparatus for detecting whether an image signal is in the film mode, includes a motion information calculator calculating a motion information of the respective fields by comparing variations of a motion in the respective fields stored in the first and the third field buffers, a motion information buffer storing the motion information in unit of a predetermined number of fields, and a pattern matching unit determining whether the image signal is in the film mode by comparing the motion information of the respective fields stored in the unit of the predetermined number of fields with a pattern of the field having a predetermined periodicity in accordance with a 3:2 pull-down conversion, and by subsequently determining whether the motion information matches the pattern.

42 Claims, 14 Drawing Sheets

U.S. PATENT DOCUMENTS

| | | | |
|---|---|---|---|
| 5,982,444 | A | 11/1999 | Kato et al. |
| 5,995,154 | A | 11/1999 | Heimburger et al. |
| 6,014,182 | A | 1/2000 | Swartz |
| 6,058,140 | A | 5/2000 | Smolenski |
| 6,061,100 | A | 5/2000 | Ward et al. |
| 6,108,041 | A | 8/2000 | Faroudja et al. |
| 6,201,577 | B1 | 3/2001 | Swartz |
| 6,297,848 | B1 | 10/2001 | Westerman |
| 6,370,198 | B1 | 4/2002 | Washino |
| 6,559,890 | B1 | 5/2003 | Holland et al. |
| 6,580,463 | B2 | 6/2003 | Swartz |
| 6,700,622 | B2 | 3/2004 | Adams et al. |
| 6,757,022 | B2 * | 6/2004 | Wredenhagen et al. ..... 348/452 |
| 6,891,571 | B2 | 5/2005 | Shin et al. |
| 6,937,655 | B2 | 8/2005 | De Haan et al. |
| 6,989,845 | B1 | 1/2006 | Okamoto et al. |
| 2002/0149703 | A1 | 10/2002 | Adams et al. |
| 2003/0189667 | A1 | 10/2003 | Chow |

FOREIGN PATENT DOCUMENTS

| | | |
|---|---|---|
| EP | 1091580 | 4/2001 |
| EP | 1 100 267 | 5/2001 |
| EP | 1 168 842 | 1/2002 |
| EP | 1 198 137 A1 | 4/2002 |
| EP | 1 198 139 | 4/2002 |
| GB | 2 258 580 | 2/1993 |
| JP | 03-280681 | 12/1991 |
| JP | 04-137892 | 5/1992 |
| JP | 07-288780 | 10/1995 |
| JP | 10-93930 | 4/1998 |
| JP | 2001-028735 | 1/2001 |
| JP | 2002-016944 | 1/2002 |
| JP | 2002-57993 | 2/2002 |
| KR | 2001-2659 | 1/2001 |
| KR | 2001-90568 | 10/2001 |
| WO | WO 95/24100 | 9/1995 |
| WO | 00/16561 | 3/2000 |
| WO | WO 02/56597 | 7/2002 |

OTHER PUBLICATIONS

U.S. Appl. No. 10/695,169, filed Oct. 29, 2003, Jung.
U.S. Appl. No. 10/704,663, filed Nov. 12, 2003, Lee et al.
U.S. Appl. No. 10/714,605, filed Nov. 18, 2003, Jung et al.
European Search Report for European Office Application No. 03026725.6.
Chinese Office Action for Application No. 200310116599.7.
Japanese Office Action for Japanese Application No. 2003-423610.
German Office Action issued on Apr. 24, 2006 with respect to German Patent Application No. 10331048.7.
Japanese Office Action issued on Nov. 21, 2006 with respect to Japanese Patent Application No. 2003-274297, which corresponds to the above-referenced application.

* cited by examiner

| DIVIDER / FIELD | NUMBER OF MOTION BLOCKS | ÷2 (1ST) | ÷4 (2ND) | ÷16 (3RD) | ÷128 (4TH) |
|---|---|---|---|---|---|
| | FILM IMAGE WITH NOISE | | | | |
| 1 | 1030 | 515 | 257 | 64 | 8 |
| 2 | 1060 | 530 | 265 | 66 | 8 |
| 3 | 1008 | 504 | 252 | 63 | 7 |
| 4 | 1024 | 512 | 256 | 64 | 8 |
| 5 | 30 | 15 | 7 | 1 | 0 |
| 6 | 942 | 471 | 235 | 58 | 7 |
| 7 | 951 | 475 | 237 | 59 | 7 |
| 8 | 1068 | 534 | 267 | 66 | 8 |
| 9 | 1043 | 521 | 260 | 65 | 8 |
| 10 | 24 | 12 | 6 | 1 | 0 |
| 11 | 1151 | 515 | 257 | 71 | 8 |
| 12 | 1171 | 585 | 292 | 73 | 9 |
| 13 | 1215 | 607 | 303 | 75 | 9 |
| 14 | 1212 | 606 | 303 | 75 | 9 |

PATTERN MATCHING → → → →

(FILM MODE)

FIG.9B

| FIELD \ DIVIDER | NUMBER OF MOTION BLOCKS | ÷2 (1ST) | ÷4 (2ND) | ÷16 (3RD) | ÷128 (4TH) |
|---|---|---|---|---|---|
| | | FILM IMAGE WITH NOISE | | | |
| 1 | 485 | 242 | 121 | 30 | 3 |
| 2 | 459 | 229 | 114 | 28 | 3 |
| 3 | 503 | 251 | 125 | 31 | 3 |
| 4 | 466 | 233 | 116 | 29 | 3 |
| 5 | 0 | 0 | 0 | 0 | 0 |
| 6 | 428 | 214 | 107 | 26 | 3 |
| 7 | 438 | 219 | 109 | 27 | 3 |
| 8 | 407 | 203 | 101 | 25 | 3 |
| 9 | 379 | 189 | 94 | 23 | 2 |
| 10 | 1 | 0 | 0 | 0 | 0 |
| 11 | 371 | 185 | 92 | 23 | 2 |
| 12 | 331 | 165 | 82 | 20 | 2 |
| 13 | 416 | 208 | 104 | 26 | 3 |
| 14 | 368 | 184 | 92 | 23 | 2 |

PATTERN MATCHING →

↓

(FILM MODE)

| DIVIDER FIELD | NON-FILM IMAGE | | | | |
|---|---|---|---|---|---|
| | NUMBER OF MOTION BLOCKS | ÷2 (1ST) | ÷4 (2ND) | ÷16 (3RD) | ÷128 (4TH) |
| 1 | 179 | 89 | 44 | 11 | 1 |
| 2 | 172 | 86 | 43 | 10 | 1 |
| 3 | 177 | 88 | 44 | 11 | 1 |
| 4 | 164 | 82 | 41 | 10 | 1 |
| 5 | 167 | 83 | 41 | 10 | 1 |
| 6 | 147 | 73 | 36 | 9 | 1 |
| 7 | 148 | 74 | 37 | 9 | 1 |
| 8 | 146 | 73 | 36 | 9 | 1 |
| 9 | 153 | 76 | 38 | 9 | 1 |
| 10 | 124 | 62 | 31 | 7 | 0 |
| 11 | 137 | 68 | 34 | 8 | 1 |
| 12 | 116 | 58 | 29 | 7 | 0 |
| 13 | 140 | 70 | 35 | 8 | 1 |
| 14 | 124 | 62 | 31 | 7 | 0 |

PATTERN MATCHING → → → → ↓

(NON-FILM MODE)

| ADDRESS / DIVIDER | 0 | 1 | 2 | 3 | 4 | 5 | 6 | 7 | 8 | 9 |
|---|---|---|---|---|---|---|---|---|---|---|
| 1ST (÷2) | 585 | 607 | 512 | 15 | 471 | 475 | 534 | 521 | 12 | 575 |
| 2ND (÷4) | 256 | 7 | 235 | 237 | 267 | 260 | 6 | 287 | 292 | 303 |
| 3RD (÷16) | 64 | 1 | 58 | 59 | 66 | 65 | 1 | 71 | 73 | 75 |
| 4TH (÷128) | 0 | 8 | 9 | 9 | 0 | 0 | 7 | 7 | 8 | 8 |

QUANTIZATION VALUE OF CURRENT FIELD

| ADDRESS / DIVIDER | 0 | 1 | 2 | 3 | 4 | 5 | 6 | 7 | 8 | 9 |
|---|---|---|---|---|---|---|---|---|---|---|
| 1ST (÷2) | 585 | 607 | 606 | 15 | 471 | 475 | 534 | 521 | 12 | 575 |
| 2ND (÷4) | 303 | 7 | 235 | 237 | 267 | 260 | 6 | 287 | 292 | 303 |
| 3RD (÷16) | 75 | 1 | 58 | 59 | 66 | 65 | 1 | 71 | 73 | 75 |
| 4TH (÷128) | 0 | 8 | 9 | 9 | 9 | 0 | 7 | 7 | 8 | 8 |

QUANTIZATION VALUE OF CURRENT FIELD → FILM MODE

FIG.11A

| ADDRESS / DIVIDER | 0 | 1 | 2 | 3 | 4 | 5 | 6 | 7 | 8 | 9 |
|---|---|---|---|---|---|---|---|---|---|---|
| 1ST (÷2) | 0 | 356 | 113 | 347 | 360 | 0 | 507 | 124 | 365 | 365 |

▨ QUANTIZATION VALUE OF CURRENT FIELD → FILM MODE

FIG.11B

| ADDRESS / DIVIDER | 0 | 1 | 2 | 3 | 4 | 5 | 6 | 7 | 8 | 9 |
|---|---|---|---|---|---|---|---|---|---|---|
| 1ST (÷2) | 0 | 356 | 113 | 347 | 360 | 0 | 507 | 124 | 365 | 365 |

▨ QUANTIZATION VALUE OF CURRENT FIELD → FILM MODE

FIG.11C

| ADDRESS / DIVIDER | 0 | 1 | 2 | 3 | 4 | 5 | 6 | 7 | 8 | 9 |
|---|---|---|---|---|---|---|---|---|---|---|
| 1ST (÷2) | 0 | 373 | 113 | 347 | 360 | 0 | 507 | 124 | 365 | 365 |

▨ QUANTIZATION VALUE OF CURRENT FIELD → FILM MODE

APPARATUS FOR AND METHOD OF DETECTING WHETHER INCOMING IMAGE SIGNAL IS IN FILM MODE

CROSS-REFERENCE TO RELATED APPLICATIONS

This application claims the benefit of Korean Patent Application No. 2002-41021, filed Jul. 13, 2002, in the Korean Intellectual Property Office, the disclosure of which is incorporated herein by reference.

BACKGROUND OF THE INVENTION

1. Field of the Invention

The present invention generally relates to an apparatus for and a method of detecting a mode of an image signal, and more particularly, to an apparatus for, and a method of detecting whether the image signal is from a film source, by generating and accumulating a pattern using motion information of the image signal and then by comparing the accumulated pattern with a threshold.

2. Description of the Related Art

Generally, a film source, such as a movie, includes 24 progressive frames per second. As for the National Television System Committee (NTSC) TV signal and DVD signal, for example, each signal includes 60 interlaced fields per second. Accordingly, in order to broadcast the film source to a TV set (terminal), the 24 progressive frames per second need to be converted to the 60 interlaced fields per second. It is a 3:2 pull-down scheme (conversion) that is used in the above conversion.

The 3:2 pull-down scheme (conversion) converts two 24 Hz frames into five 60 Hz fields. More specifically, one field is repeated to form three fields from a first frame while two fields are formed from a second frame. The 3:2 pull-down scheme extracts from the first frame a top field having odd lines and a bottom field having even-lines, and then re-extracts (repeats) the top field. After that, the 3:2 pull-down scheme extracts another bottom field and another top field from the second frame.

Using the 3:2 pull-down scheme, the two progressive frames are converted into the five interlaced fields. Accordingly, as the film source is 3:2 pull-down converted and transmitted from a transmitting end (terminal or station), a receiving end (terminal or station) obtains the complete original progressive frames before the 3:2 pull-down conversion, through a combination of the two fields of the 3:2 pull-down converted interlaced fields. In other words, the receiving terminal can obtain original images having a high quality according to an Interlace-to-Progressive Conversion (IPC) process and the 3:2 pull-down converted interlaced fields.

Accordingly, the receiving terminal needs to carry out detecting of a film mode whether a received image is from a 3:2 pull-down converted film source or from a non-film source, and then processing image signals of the received image accordingly. Such film mode detection and image signal processing are also required for the image signals other than the NTSC TV signal.

FIG. 1 is a block diagram showing a conventional apparatus for detecting a film mode of an NTSC image signal. A conventional film mode detecting scheme calculates a sum of absolute difference (SAD) of two neighboring fields of a 3:2 pull-down converted image signal, and then detects the film mode of the image signal using a period of 5 SADs.

As shown in FIG. 1, the conventional film mode detecting apparatus includes a field buffer 10, a difference calculator 18, an absolute value calculator 20, a field adder 30, a limiter 40, a band-pass filter 50, a power calculator 60 and a mode detector 70.

The field buffer 10 stores fields of incoming image signals. The field buffer 10 includes a first field buffer 12, a second field buffer 14 and a third field buffer 16. Accordingly, the fields of the incoming image signals are sequentially stored in and outputted from the first, the second and the third buffers 12, 14 and 16.

The difference calculator 18, the absolute value calculator 20 and the field adder 30 calculate the SAD of the image signal. The difference calculator 18 calculates a difference of the respective pixels allocated in the same position of the respective fields that are stored in the first and the third buffers 12 and 16. The absolute value calculator 20 calculates an absolute value of the difference of the pixels of the respective fields calculated at the difference calculator 18.

The field adder 30 adds the absolute value of the difference of the pixels calculated at the absolute calculator 20 in unit of field. Accordingly, SADs with respect to the respective fields of the incoming image signals are calculated.

Among the SADs calculated with respect to the respective fields, the limiter 40 limits an amplified value of the SAD, which can cause a scene change, i.e., a main cause of defective detection of the film mode, to a predetermined threshold.

The band-pass filter 50 band-pass filters the SADs transmitted from the limiter 40, thereby extracting signals of 5-field period with respect to a frequency axis. The signals with 5-field period, which are extracted from the band-pass filter 50, are sinusoidal waves.

The power calculator 60 calculates the power of sinusoidal waves outputted from the band-pass filter 50. Accordingly, through such calculated power, it can be checked how much of the SADs of the respective fields have a period of the 5 fields.

The mode detector 70 compares the predetermined threshold and the power calculated at the power calculator 60, thereby determining the film mode of the incoming image signals based on a comparison result. That is, the conventional mode detector 70 determines the incoming image signals are in the film mode when the power calculated at the power calculator 60 is greater than the predetermined threshold. The conventional mode detector 70 determines the incoming image signals in the non-film mode when the power calculated at the power calculator 60 is less than the predetermined threshold. Also, according to the comparison result between he predetermined threshold and the power calculator 60, the conventional mode detector 70 outputs '1' for the film mode or '0' for the non-film mode together with the incoming image signals to an IPC unit that performs the IPC process, or to a storage unit that stores the incoming image signals.

FIG. 2 is a graph showing the SADs calculated with respect to the respective fields that are outputted from the field adder 30 of FIG. 1. Here, it is assumed that no noise has occurred during transmitting the 3:2 pull-down converted image signals (streams).

Referring to FIG. 2, the scene change occurs at a point of field no. 9, which prevents finding a period of the 5 fields. Accordingly, the limiter 40 limits the amplified value of the SAD at the field no. 9 to the predetermined threshold, thereby eliminating the cause of a scene change. As the band-pass filter 50 band-pass filters the limited SAD with a center at $\omega = 2\pi/5$ and a DC gain at '0', the outputted SAD is a sinusoidal wave having a period of ⅕ field with respect to the time axis. As a property of the SAD having ⅕ period increases, a relatively large amplitude of the sinusoidal wave is obtained. In order to calculate the power with respect to the amplitude of the sinusoidal wave, the power calculator 60 calculates a sum of squares of the amplitude, to thereby determine whether the period of the SADs is the 5 fields. Accordingly, after comparing the SAD with the predetermined threshold, the mode detector 70 determines the incoming image signals are in the film mode when the SAD exceeds the predetermined threshold, and then outputs a determination result.

Usually, the SADs of the two fields of the 3:2 pull-down converted stream (incoming image signal) have the period of the 5 fields. However, such periodicity of the SADs causes a loss of regularity of the SADs when more noise is added to the SADs.

Another problem is that an incorrect periodicity of the incoming image signals can be outputted. That is, when the limiter 40 limits a peak value of the SAD to eliminate the cause of the scene change, the limiter 40 removes a value of the SAD by the predetermined value depending on the 3:2 full-down converted stream even when the value of the SAD is small compared to the predetermined value.

Further, the mode detector 70 has the predetermined threshold to determine the film mode of the incoming image signals based on the comparison of the SADs. Here, since incoming streams can have different powers, using a fixed threshold for all the incoming streams can cause unreliable film mode detection of the image signals.

In order to overcome the above problem, conventionally, many candidates for the thresholds have been used to obtain appropriate thresholds. However, with a lot of noise in the incoming stream and great SAD changes between the neighboring fields, the film mode detection can be quite inaccurate.

SUMMARY OF THE INVENTION

Accordingly, it is an aspect of the present invention to provide an apparatus for and method of detecting a mode of image signals, which is capable of accurately detecting whether the image signals, which are 3:2 pull-down converted, are in a film mode.

Additional aspects and advantages of the invention will be set forth in part in the description which follows and, in part, will be obvious from the description, or may be learned by practice of the invention.

The above and/or other aspects are accomplished by an apparatus for detecting whether an image signal is in a film mode. The apparatus includes a first field buffer, a second field buffer and a third field buffer that sequentially buffer respective fields of the image signal by order of input, using the respective fields stored in the first, the second and the third field buffers, a motion information calculator calculating motion information of the respective fields by comparing variations of a motion in the respective fields stored in the first and the third field buffers, a motion information buffer storing the motion information in unit of a predetermined number of fields, and a pattern matching unit determining whether the image signal is in the film mode by comparing the motion information of the respective fields stored in the unit of the predetermined number of fields with a pattern of the field having a predetermined periodicity in accordance with a 3:2 pull-down conversion, and by subsequently determining whether the motion information matches the pattern.

The motion information calculator calculates the motion information, using one of a calculation of motion vector of the respective fields stored in the first and the third field buffers, a calculation of a sum of the calculated motion vector, a calculation of a sum of absolute difference (SAD), a calculation of a sum of the calculated SAD, a calculation of a number of motion blocks, and a calculation of a sum of the motion blocks.

The pattern matching unit performs a gradual quantization on the motion information in which the motion information in the unit of the predetermined number of fields is divided by gradually increasing numbers, thereby reducing an external influence on the image signal, compares a resultant value of each quantization with the field pattern in accordance with the 3:2 pull-down conversion, and thereby determines whether the image signal is in the film mode by determining from the comparison result whether the resultant value of the quantization matches with the field pattern.

The gradually increasing numbers used in the gradual quantization are $2^n$ (n=1, 2, 3, . . . , m). Preferably, the gradually increasing numbers used in the gradual quantization are $2^n$, with n being 1, 2, 4 and 7 among 1, 2, 3, . . . , m. Further, the field pattern in accordance with the 3:2 pull-down conversion set to use in the pattern matching unit is a pattern in which a motionless field appears in a period of five fields.

The above and/or other aspects are also accomplished by a method of detecting whether an image signal is in a film mode, using respective fields stored in a first field buffer, a second field buffer and a third field buffer that sequentially buffer respective fields of the image signal by order of input. The method includes calculating a motion information of the respective fields by comparing variations of a motion in the respective fields stored in the first and the third field buffers, storing the motion information in unit of a predetermined number of fields, and determining whether the image signal is in the film mode by comparing the motion information of the respective fields stored in the unit of the predetermined number of fields with a pattern of the field having a predetermined periodicity in accordance with a 3:2 pull-down conversion, and by subsequently determining whether the motion information matches the pattern.

The calculating of the motion information includes calculating the motion information using one of a calculation of motion vector of the respective fields stored in the first and the third field buffers, a calculation of a sum of the calculated motion vector, a calculation of a sum of absolute difference (SAD), a calculation of a sum of the calculated SAD, a calculation of a number of motion blocks, and a calculation of a sum of the motion blocks.

The determining of the film mode includes performing a gradual quantization on the motion information in which the motion information in the unit of the predetermined number of fields is divided by gradually increasing numbers, thereby reducing an external influence on the image signal, compares a resultant value of each quantization with the field pattern in accordance with the 3:2 pull-down conversion, and thereby determines whether the image signal is in the film mode according to the comparison result whether the resultant value of the quantization matches with the field pattern.

The gradually increasing numbers used in the gradual quantization are $2^n$ (n=1, 2, 3, . . . , m). It is possible that the gradually increasing numbers used in the gradual quantization are $2^n$, with n being 1, 2, 4 and 7 among 1, 2, 3, . . . , m. Further, the field pattern in accordance with the 3:2 pull-down conversion set to use in the determining of the film mode is a pattern in which a motionless field appears in a period of five fields.

According to another aspect of the present invention, the resultant value of the quantization on the motion information and the field pattern in accordance with the 3:2 pull-down conversion are compared to each other, and whether the image signals are in the film mode is determined according to whether the resultant value of the quantization matches the field pattern. As a result, computational requirements for detecting whether the image signals are in the film mode, can be reduced.

Further, with performing the gradual quantization on the motion information, the resultant value of each quantization is compared with the field pattern in accordance with the 3:2 pull-down conversion. As a result, whether the image signals are in the film mode, can be detected with higher accuracy.

Accordingly, a more accurate interlace-to-progressive (IPC) conversion process is enabled based on the accurately detected mode of the image signals, and a storage capacity required for the image signals in the film mode can be reduced.

BRIEF DESCRIPTION OF THE DRAWINGS

These and/or other aspects and advantages of the invention will become apparent and more readily appreciated from the following description of the preferred embodiments, taken in conjunction with the accompanying drawings of which:

FIGS. 9A, 9B and 9C are tables showing a film mode detection according to the gradual quantization with respect to the motion information of the pattern matching unit of the apparatus shown in FIG. 3;

FIGS. 11A, 11B and 11C are another tables showing the variations of the pattern addresses for the comparison between the image signals with a little noise and the results of gradual quantization with respect to the motion information of the pattern matching unit of the apparatus shown in FIG. 3.

DETAILED DESCRIPTION OF THE PREFERRED EMBODIMENTS

Figure 1:
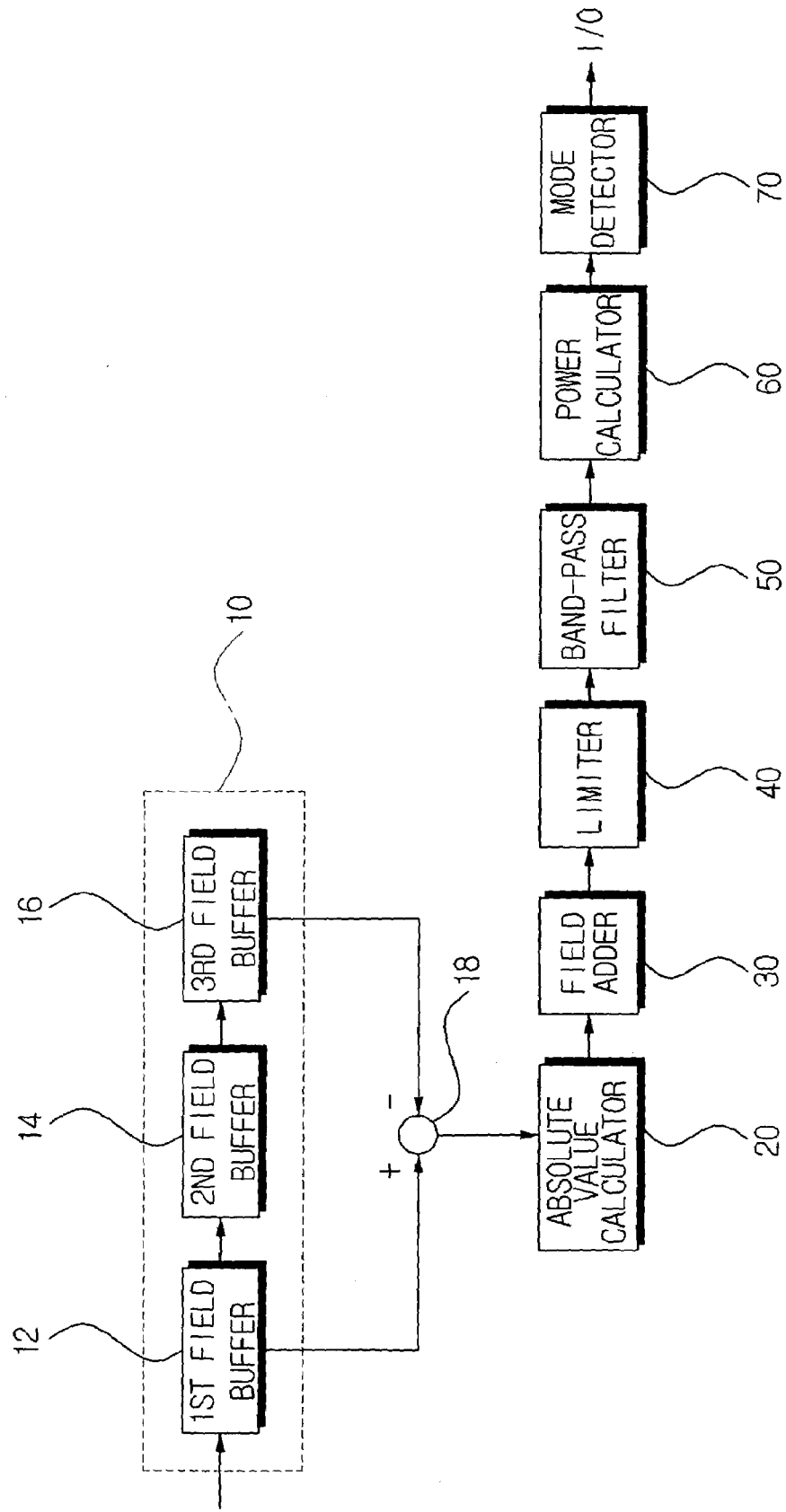
FIG. 1 is a block diagram showing a conventional apparatus for detecting a film mode of National Television System Committee (NTSC) image signals.
Figure 2:
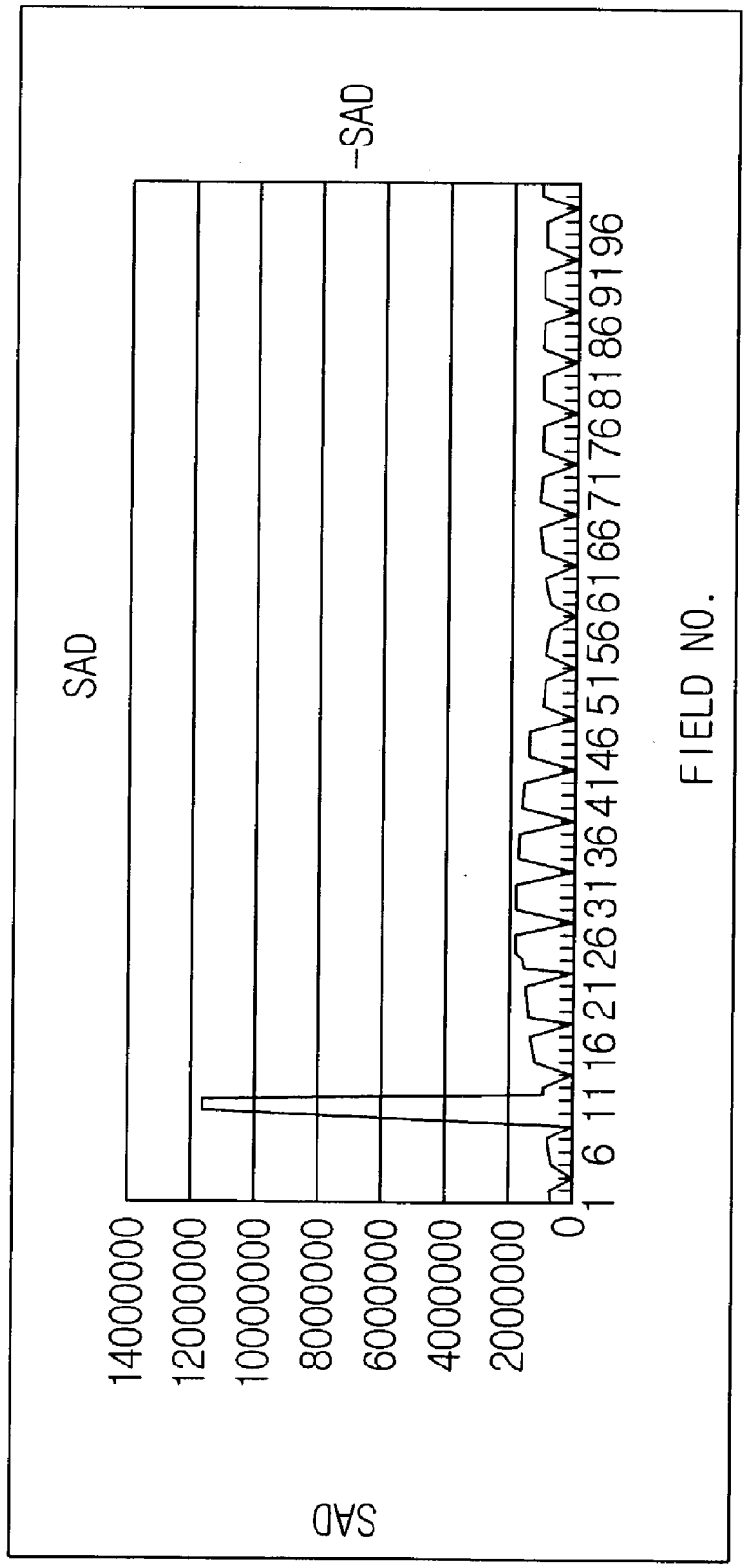
FIG. 2 is a graph showing SADs calculated with respect to fields outputted from a field adder of the apparatus shown FIG. 1.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

The present invention will be described in greater detail with reference to the accompanying drawings.

Figure 3:
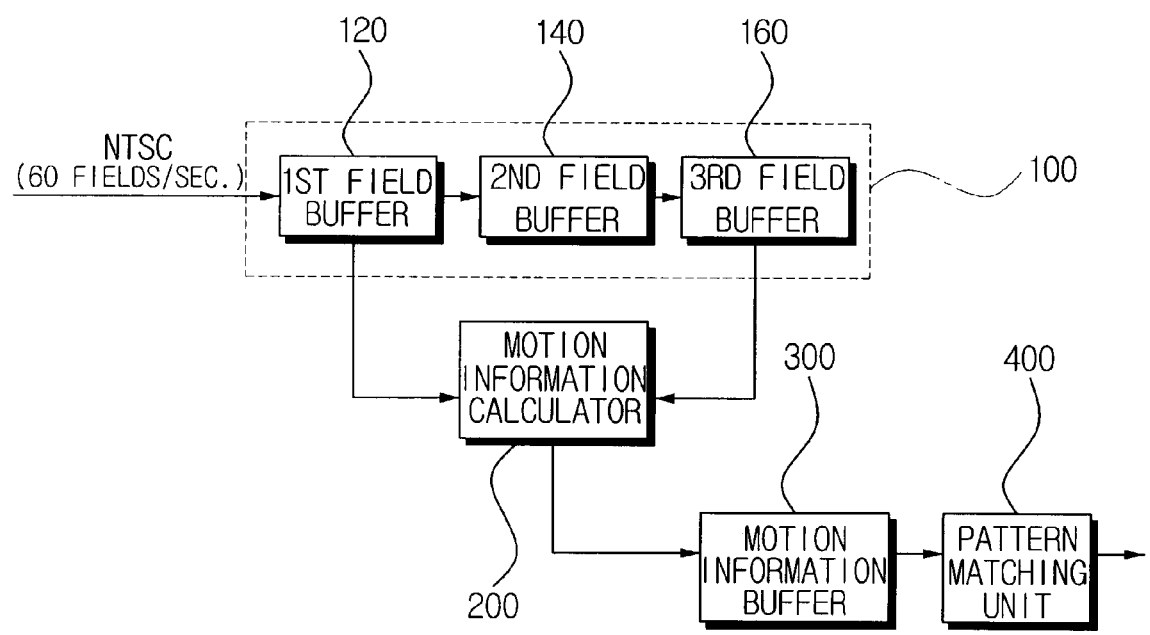
FIG. 3 is a block diagram showing an apparatus for detecting a film mode of an image signal according to an embodiment of the present invention.

FIG. 3 is a block diagram showing an apparatus for detecting a film mode of an image signal according to an embodiment of the present invention. Referring to FIG. 3, the film mode detecting apparatus includes a field buffer 100, a motion information calculator 200, a motion information buffer 300 and a pattern matching unit 400.

The field buffer 100 stores incoming image signals in unit of field and outputs the stored image signals. In this embodiment, the incoming image signals will be described as the National Television System Committee (NTSC) signals as an example. The field buffer 100 includes a first field buffer 120, a second field buffer 140 and a third field buffer 160. The incoming image signals are sequentially stored in the first, the second and the third field buffers 120, 140 and 160 and outputted.

The motion information calculator 200 compares the fields stored in the first and the third field buffers 120 and 160, thereby calculating motion information in accordance with motions in the compared fields.

The motion information buffer 300 stores the motion information of the respective fields calculated at the motion information calculator 200 and outputs the stored motion information. In this embodiment, the motion information is stored in unit of 10 fields as an example.

The pattern matching unit 400 compares the motion information stored in the motion information buffer 300 with a field pattern having a regular periodicity according to a 3:2 pull-down conversion of the image signals, thereby determining that the image signals are in the film mode when the motion information matches the field pattern according to the 3:2 pull-down conversion.

According to an aspect of the present invention, the motion information calculator 200 calculates the motion information of the respective fields from the respective fields stored in the first and the third field buffers 120 and 160 through one of motion vector calculation, SAD calculation, and motion block coefficient (number) calculation methods.

In the motion vector calculation method, the motion information is obtained by estimating motions among the respective pixels of the fields using the motion vectors of the respective fields, and converting the estimated motions into vectors. The motion information calculator 200 can output to the motion information buffer 300 a sum of the vectors of the respective pixels of the fields in the unit of the field.

In the SAD calculation method, an absolute value of a difference of the respective fields of the fields stored in the first and the third field buffers 120 and 160 is calculated. The motion information calculator 200 can output to the motion information buffer 300 a sum of SADs of the respective pixels of the fields in the unit of the field.

In the motion block number calculation method, the number of motion blocks is calculated by dividing the fields stored in the first and the third field buffers 120 and 160 by a predetermined number of blocks, comparing an SAD or a motion vector of the corresponding blocks with a predetermined value, and counting the number of the motion blocks in which the comparison result indicates an occurrence of a certain motion.

The motion information calculated using one of the above methods, is stored in the motion information buffer 300 in unit of a predetermined number of fields. Accordingly, the pattern matching unit 400 gradually quantizes the motion information from the motion information buffer 300, which is in the unit of the predetermined number of fields, thereby decreasing external influences on the image signals, such as noise, etc. The gradual quantization represents that the motion information in the unit of the predetermined number of fields stored in the motion information buffer 300 is divided by gradually increasing numbers. The pattern matching unit 400 compares a result of the gradual quantization on the motion information with the field pattern according to the 3:2 pull-down conversion, thereby determining whether the image signals are in the film mode according to the comparison result, i.e., according to whether the compared values match each other. That is, the pattern matching unit 400 determines the image signals to be in the film mode in a case that the value obtained from the quantization on the motion information matches the field pattern according to the 3:2 pull-down conversion.

Since whether the image signals are in the film mode is determined according to a comparison between the result of the quantization on the motion information and the field pattern according to the 3:2 pull-down conversion, computational requirements for detecting the film mode of the image signals can be reduced. Further, because whether the image signals are in the film mode is determined with performing the gradual quantization with respect to the motion information, by comparing the respective results of the gradual quantization with the field pattern according to the 3:2 pull-down conversion to see whether the respective results match the field pattern, the film mode of the image signals can be detected with higher accuracy. As a result, it is possible to perform a more accurate interlace-to-progressive (IPC) conversion process in accordance with the detected mode of the image signals, and the required storage capacity for the image signals in film mode can be reduced.

Figure 4:
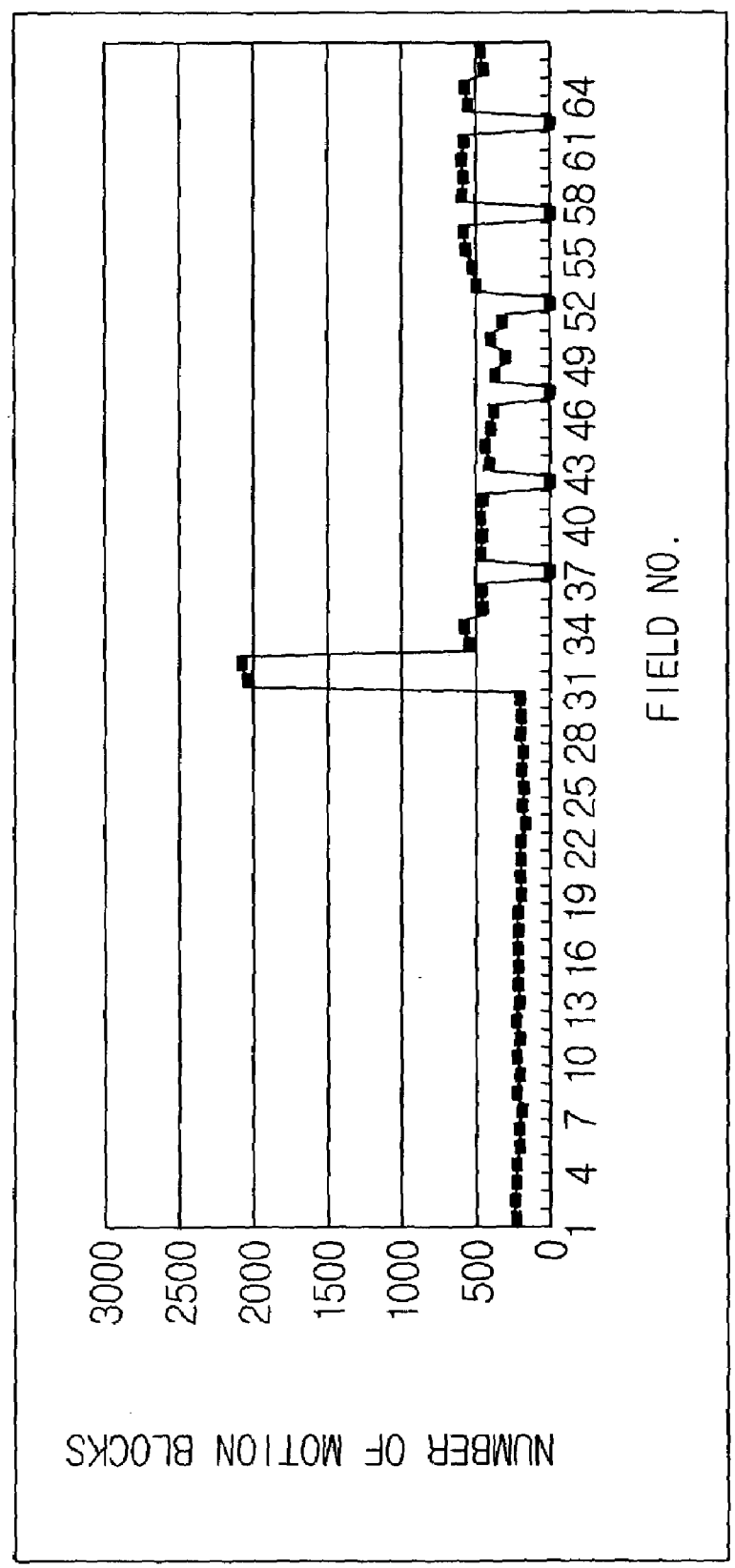
FIG. 4 is a graph showing the number of motion blocks of respective fields outputted from a motion information buffer of the apparatus shown in FIG. 3.

FIG. 4 is a graph showing an example of the number of the motion blocks of the respective fields outputted from the motion information buffer 300 of FIG. 3. Each field includes a number of blocks each representing one of a motion block and a motionless block, and the motion block represents that a motion exists. According to the graph of FIG. 4, the fields of the incoming image signals from field no. 1 to field no. 30 have small motions and thus, it indicates that the image signals are from a non-film source. Meanwhile, the fields of image signals from field no. 31 have approximately 500 motion blocks in the respective fields and have great motions, and thus, it indicates the image signals are from the film source which are 3:2 pull-down converted.

Figure 5:
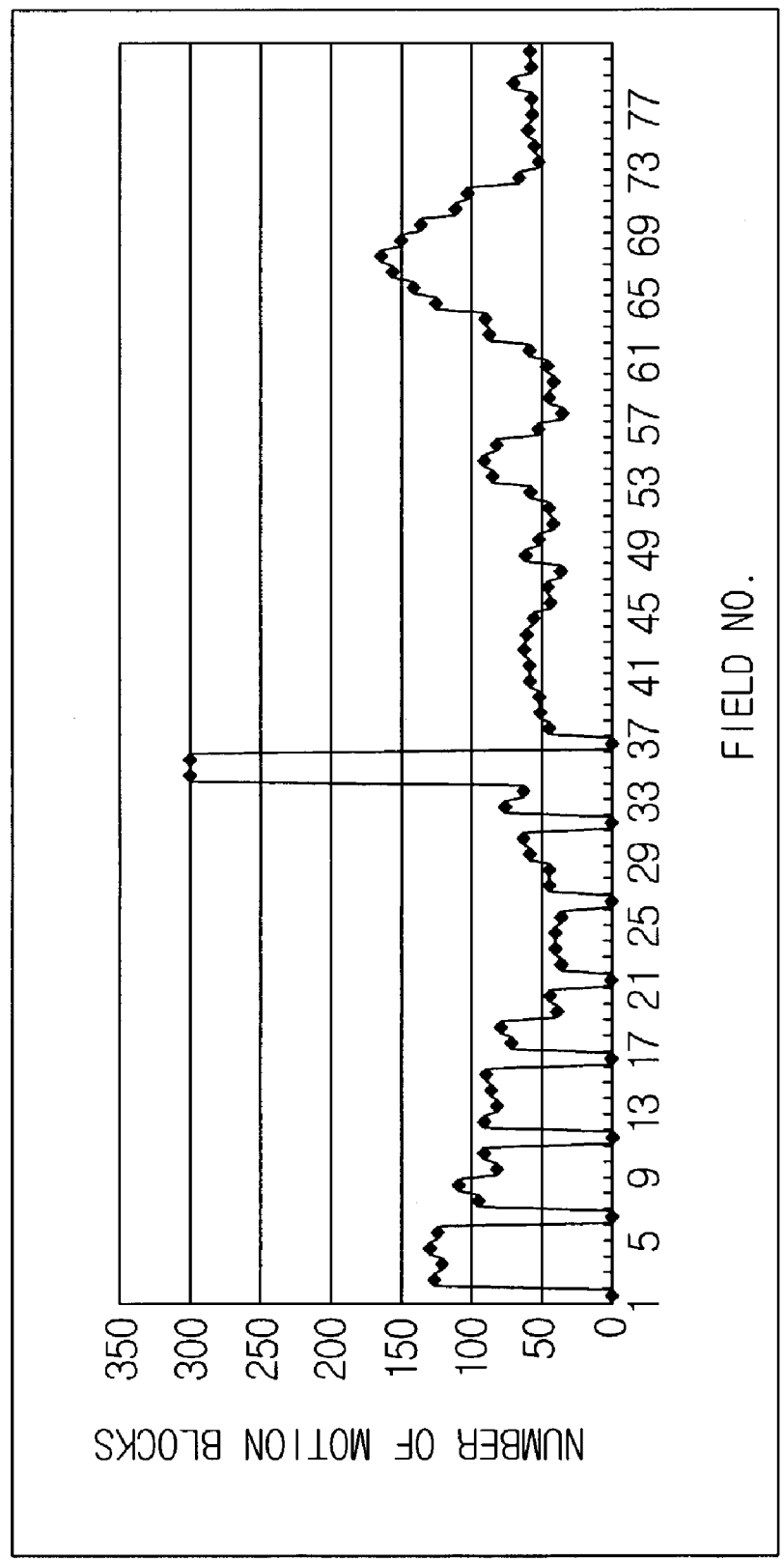
FIG. 5 is a graph showing the number of motion blocks of respective buffers outputted from the motion information buffer of the apparatus shown in FIG. 3.

FIG. 5 is a graph showing another example of the number of the motion blocks of the respective fields outputted from the motion information buffer 300. According to the graph of FIG. 5, the fields of the incoming image signals from the field no. 1 to the field no. 36 have approximately 50 to 100 motion blocks for the respective fields, indicating that the image signals are from the file source, which are 3:2 pull-down converted, having small motion among the respective fields. After the field no. 37, it is indicated that the images signals are from the non-film source having the small motion among the fields.

Figure 6:
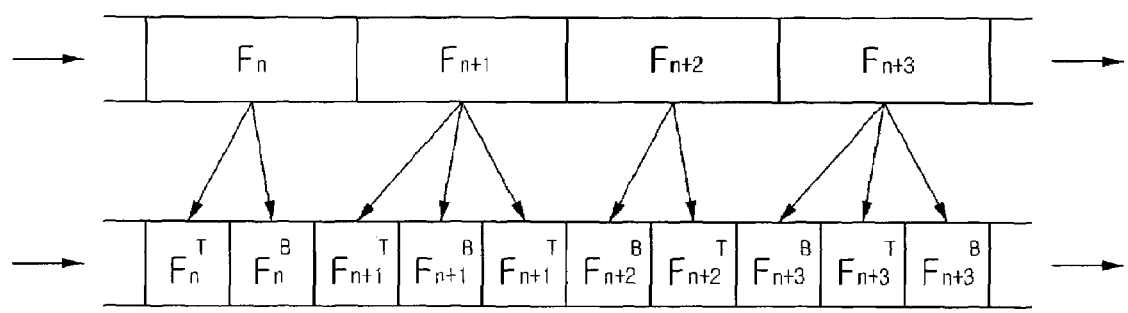
FIG. 6 is a view showing a process of 3:2 pull-down conversion at a transmitting terminal converting a film source of a movie into NTSC signals, to broadcast the movie through a TV set in the apparatus shown in FIG. 3.

FIG. 6 is a view showing a process of the 3:2 pull-down conversion at a transmitting terminal (station) converting the film source of a movie into the NTSC signals, to enable broadcasting of the movie through TV. As shown in FIG. 6, converting the film source of 24 frames per second into video signals of 60 fields (i.e., 30 frames) per second includes converting a first frame of the film source into 2 fields of the NTSC signals and converting a second frame of the film source into 3 fields of the NTSC signals.

More specifically, converting the film source into the 2 fields of the NTSC signals includes extracting top and bottom fields from the first frame of the film source to construct the 2 fields of the NTSC signals. Further, converting the film source into the 3 fields of the NTSC signals includes extracting top and bottom fields from the second frame of the film source, and then re-extracting (repeating) either top or bottom fields to construct 3 fields of the NTSC signals.

Referring to FIG. 6, $F_n^T$ and $F_n^B$ denote top and the bottom fields of a frame $F_n$ of the film source, respectively, while $F_{n+1}^T$ and $F_{n+1}^B$ denote top and the bottom fields of a frame $F_{n+1}$ of the film source, respectively. Further, $F_{n+2}^T$ and $F_{n+2}^B$ denote top and the bottom fields of a frame $F_{n+2}$ of the film source, respectively, while $F_{n+3}^T$ and $F_{n+3}^B$ denote top and the bottom fields of a frame $F_{n+3}$ of the film source.

Usually, a picture sequence, which is converted into the NTSC signal with 60 fields per second, is repeated in unit of 10 fields, i.e., $F_n^T, F_n^B, F_{n+1}^T, F_{n+1}^B, F_{n+1 }{F_{n+3}}^B, F_{n+3}^T$, and $F_{n+3}^B$.

Figure 7:
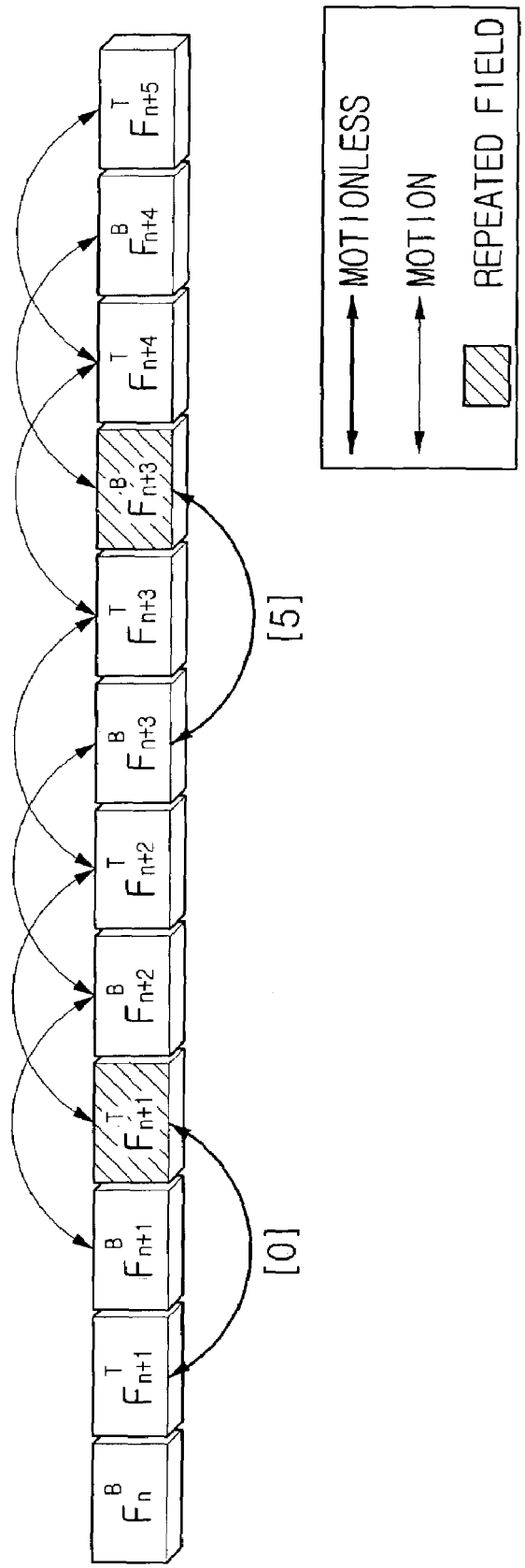
FIG. 7 is a view showing a process of storing motion information for the respective fields of the motion information buffer according to calculation of the motion information of the respective fields of the motion information calculator of the apparatus shown in FIG. 3.

FIG. 7 is a view showing a process of storing the motion information of the respective fields in the motion information buffer 300 according to a motion information calculation on the respective fields in the motion information calculator 200. FIG. 7 shows a characteristic of the 3:2 pull-down converted film source, i.e., a motionless field in every fifth field (five fields). In a case that the motionless field belongs to the top field, the motion information buffer 300 stores the motion information calculated at the motion information calculator 200 from an address '0' of the motion information. In a case that the motionless field belongs to the bottom field, the motion information buffer 300 stores the motion information calculated at the motion information calculator 200 from an address '5' of the motion information.

Figure 8:
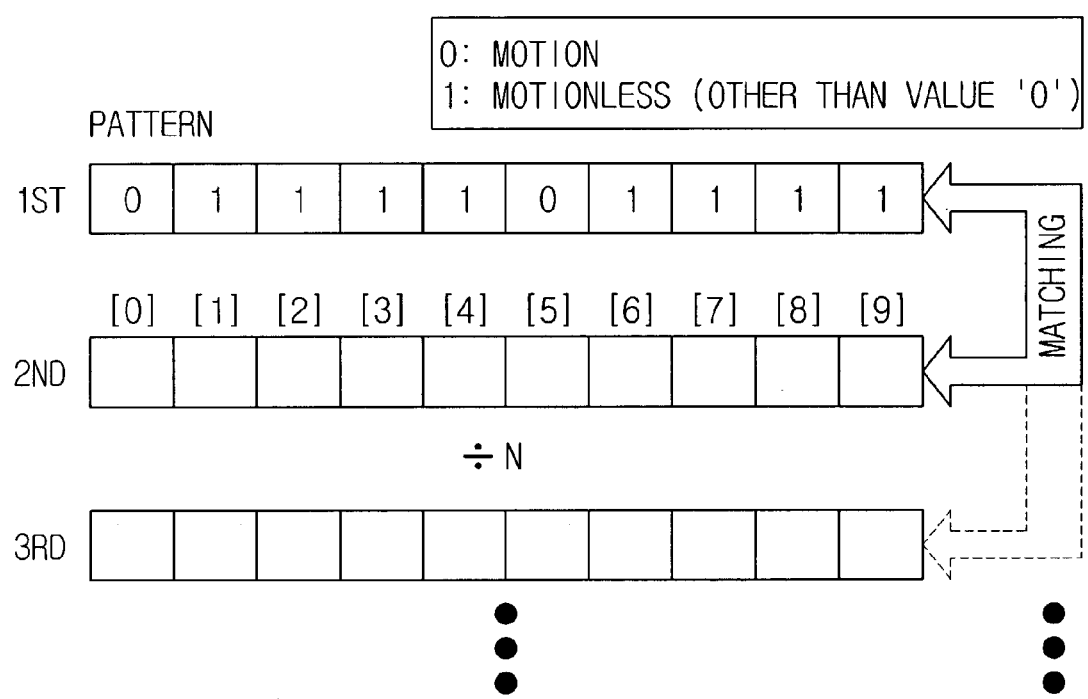
FIG. 8 is a view explaining a process of matching a pattern of the pattern matching unit of the apparatus shown in FIG. 3.

FIG. 8 is a view explaining a process of matching field patterns at the pattern matching unit 400 of FIG. 3. As shown in FIG. 8, the pattern matching unit 400 compares the field pattern with a periodicity of a motionless field in every fifth field with the motion information stored in the motion information buffer 300 for the respective corresponding fields to determine whether the field pattern matches the motion information, thereby determining the film mode of the image signals. In the field pattern at a period having a motionless field in every fifth field, number '0' denotes no motion in the fields while number '1' denotes a motion in the fields. Having the motion in the fields also denotes that there exists more than one motion block in the respective fields. According to this embodiment of the present invention, the pattern matching unit 400 determines the matching of the field pattern of a 5-field period in the unit of 10 fields.

Accordingly, when the comparison between the field pattern of 10 fields and the motion information indicates that the image signals are in the non-film mode, the pattern matching unit 400 performs the gradual quantization with respect to the motion information, and compares the motion information with the pattern in every quantization to determine whether the pattern matches the motion information, thereby determining whether the image signals are in the film mode. More specifically, the pattern matching unit 400 divides the motion information by number 'N', performs the gradual quantization, compares a quantized value with the pattern, and then determines whether the image signals are in the film mode. The number 'N' is $2^n$ (n=1, 2, 3, . . . , m). It is possible that 'n' of $2^n$ is n=1, 2, 4, 7.

Figure 9A:
Figure 9C:
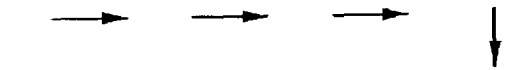

FIGS. 9A, 9B and 9C are tables showing the film mode detection according to the gradual quantization of the pattern matching unit 400 of FIG. 3 with respect to the motion information. As shown in the tables, the pattern matching unit 400 performs pattern matching in unit of 14 fields.

FIG. 9A also shows a process of pattern matching at the pattern matching unit 400 in a case that the image signals are of a film image with noise. According to the gradual quantization with respect to the motion information, the pattern matching unit 400 compares a result value of dividing the motion information by 128 with the pattern and thus determines that the result value matches the pattern. As a result, the pattern matching unit 400 determines that the image signals are in the film mode, i.e., that the image signals are of film images.

FIG. 9B also shows another process of pattern matching at the pattern matching unit 400 in a case that the image signals are of a clean film image, i.e., of a film image without noise. According to the gradual quantization with respect to the motion information, the pattern matching unit 400 compares the resultant value of dividing the motion information by 2 with the pattern, and thus determines that the resultant value matches the pattern. As a result, the pattern matching unit 400 determines that the image signals are in the film mode.

FIG. 9C shows another process of pattern matching at the pattern matching unit 400 in a case that the image signals are of non-film images. The pattern matching unit 400 determines that none of the resultant values of the gradual quantization with respect to the motion information from 2 to 128 matches the pattern. Accordingly, the pattern matching unit 400 determines that the incoming image signals are in the non-film mode.

Figure 10A:
FIGS. 10A and 10B are tables showing variations of pattern addresses for the comparison between the image signals with lots of noise and results of gradual quantization with respect to the motion information of the pattern matching unit of the apparatus shown in FIG. 3.
Figure 10B:

FIGS. 10A and 10B are tables showing variations of pattern addresses for the comparison at the pattern matching unit 400 comparing the motion information with the resultant values of the gradual quantization, for the image signals with lots of noise.

Referring to FIG. 1A, it is assumed that the number of motion blocks, i.e., the motion information, in the (n−1)th field is 1,215.

As shown in FIG. 10A, '607', a first resultant value of dividing 1,215 motion information in the (n−1)th field by 2, is compared by the pattern matching unit 400 with the pattern at the address of '1' or another pattern, which corresponds to another address or is different from the pattern at the address of '1'. When it is determined that the pattern does not match the first resultant value, '303', a second resultant value of dividing 1,215 motion information by 4, is compared by the pattern matching unit 400 with the pattern at the address of '9'. When it is determined that the pattern does not match the second resultant value, '9', another resultant value of dividing 1,215 motion information by 128, is compared by the pattern matching unit 400 with the pattern at the address of '3'. When it is still determined that the pattern does not match the another resultant value, the pattern matching unit 400 determines the image signals are not in the film mode.

Referring to FIG. 10B, it is assumed that the number of motion blocks, i.e., the motion information, in the nth field is 1,212.

As shown in FIG. 10B, '606', a first resultant value of dividing 1,212 motion information in the nth field by 2, is compared by the pattern matching unit 400 with the pattern at the address of '2'. When it is determined that the pattern does not match, the first resultant value '303', a second resultant value of dividing 1,212 motion information by 4, is compared by the pattern matching unit 400 with the pattern at the address of '0'. When it is determined that the pattern does not match, the second resultant value '75', another resultant value of dividing 1,212 motion information by, is compared by the pattern matching unit 400 with the pattern at the address of '4'. When it is still determined that the pattern does not match the another resultant value, the pattern matching unit 400 determines the image signals are not in the film mode.

FIGS. 11A, 11B and 11C are other tables showing the variations of the pattern addresses for the comparison at the pattern matching unit 400 of FIG. 3, comparing the motion information with the resultant values of the gradual quantization, for the image signals with a little noise.

Referring to FIG. 11A, it is assumed that the number of motion blocks, i.e., the motion information in the (n−2)th field, is 730.

As shown in FIG. 11A, '365', a resultant value of dividing the 730 motion information in the (n−2)th field by 2 is compared by the pattern matching unit 400 with the pattern at the address of '9'. When it is determined that the pattern matches the first resultant value, the pattern matching unit 400 determines that the image signals are in the film mode.

Referring to FIG. 11B, it is assumed that the number of motion blocks, i.e., the motion information in the (n−1)th field, is 1.

As shown in FIG. 11B, '0', a resultant value of dividing the 1 motion information in the (n−1)th field by 2, is compared by the pattern matching unit 400 with the pattern at the address of '0'. When it is determined that the pattern matches the resultant value, the pattern matching unit 400 determines that the image signals are in the film mode.

Referring to FIG. 11C, it is assumed that the number of the motion blocks, i.e., the motion information in the nth field is 747.

As shown in FIG. 11C, '373', a resultant value of dividing the 747 motion information in the nth field by 2, is compared by the pattern matching unit 400 with the pattern at the address of '1'. When it is determined that the pattern matches the resultant value, the pattern matching unit 400 determines that the image signals are in the film mode.

As described above, whether the image signals are in the film mode is determined by performing the gradual quantization with respect to the motion information, and comparing the resultant values in every quantization with the field pattern according to the 3:2 pull-down conversion to determine whether the resultant values match the field pattern. As a result, whether the image signals are in the film mode can be detected with higher accuracy. Accordingly, a more accurate interface-to-progressive conversion (IPC) process can be performed in accordance with the accurately detected mode of the image signals, and the storage capacity required for the image signals in the film mode can be reduced.

Figure 12:
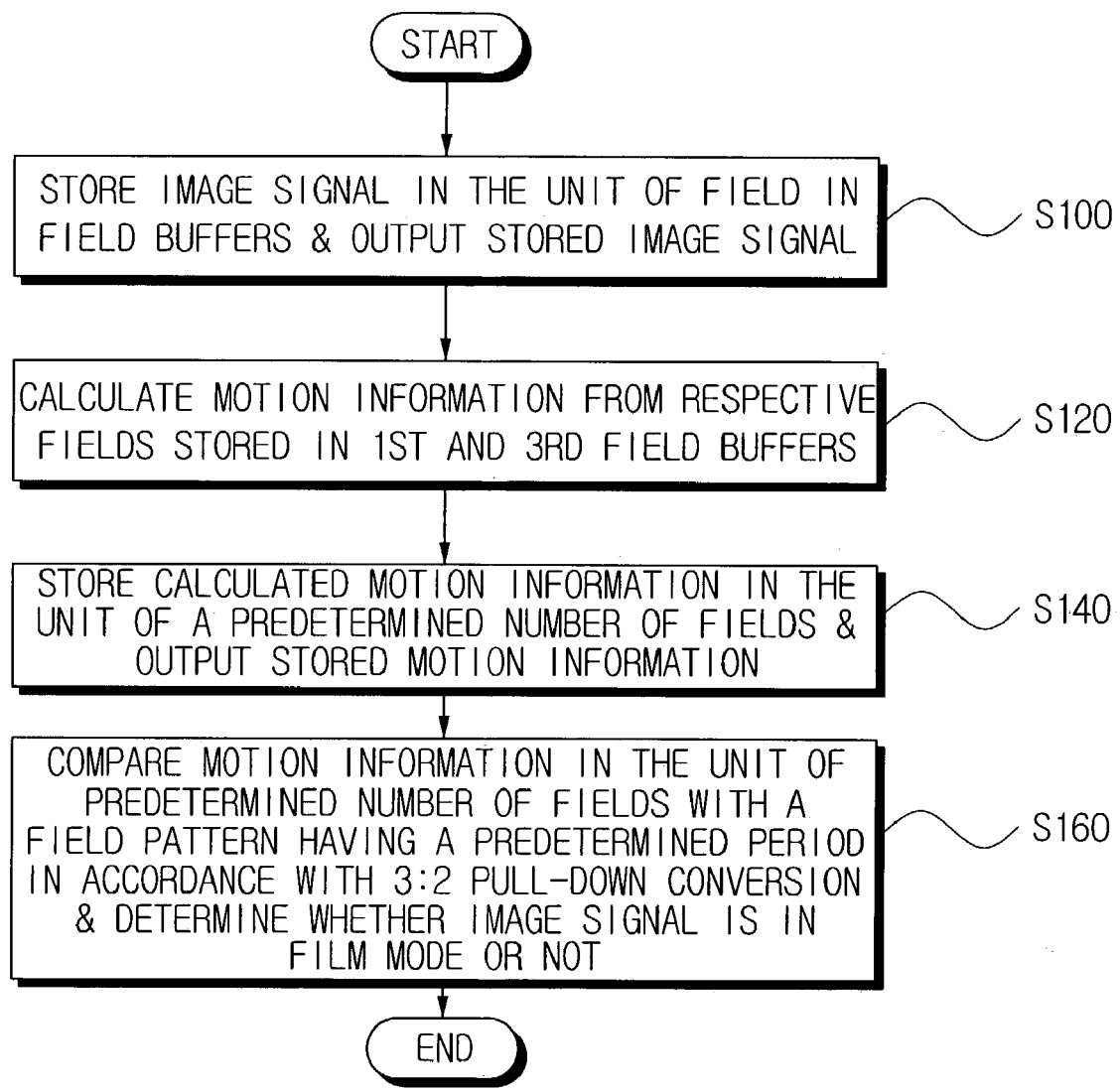
FIG. 12 is a flowchart showing a method of detecting a film mode of the image signals using the film mode detecting apparatus in the apparatus shown in FIG. 3.

FIG. 12 is a flowchart showing a method of detecting whether the image signals are in the film mode, using the film mode detecting apparatus shown in FIG. 3.

First, the field buffer 100 stores the incoming image signals in the unit of field, and outputs the stored image signals operation S100. The field buffer 100 includes a first field buffer 120, a second field buffer 140 and a third field buffer 160. Accordingly, in operation S100, the respective fields of the incoming image signals are sequentially stored in and outputted from the first, the second and the third field buffers 120, 140 and 160.

The motion information calculator 200 compares the respective fields of the first and the third field buffers 120 and 160, thereby calculating the motion information in accordance with the presence of motion in the fields operation S120.

The motion information buffer 300 stores the motion information of the respective fields calculated at the motion information calculator 200, and outputs the stored motion information operation S140. In this embodiment, the motion information of the respective fields are stored and outputted in the unit of 10 fields.

The pattern matching unit 400 compares the motion information stored in the motion information buffer 300 with the field pattern that has a predetermined period in accordance with the 3:2 pull-down conversion, to determine whether the motion information matches the field pattern and subsequently, to determine whether the image signals are in the film mode in operation S160.

The motion information calculator 200 calculates the motion information from the respective fields stored in the first and the third field buffers 120 and 160, through one of the motion vector calculation, the SAD calculation and the motion block number calculation methods.

The motion information calculated at the motion information calculator 200 is stored in the motion information buffer 300 in the unit of a predetermined number of fields. Accordingly, in order to reduce the external influences on the image signals, such as a noise, the pattern matching unit 400 gradually quantizes the motion information from the motion information buffer 300, which is in the unit of a predetermined number of fields. In every quantization, the pattern matching unit 400 compares the resultant value of the quantization with the field pattern in accordance with the 3:2 pull-down conversion, and subsequently determines whether the image signals are in the film mode or not according to whether the resultant value of the quantization matches the field pattern or not. In other words, when the resultant value of the quantization on the motion information matches the field pattern in accordance with the 3:2 pull-down conversion, the pattern matching unit 400 determines that the image signals are in the film mode.

As described above, the resultant values of the quantization on the motion information and the field pattern in accordance with the 3:2 pull-down conversion are compared with the field pattern, and whether the image signals are in the film mode is determined according to whether the resultant value of the quantization matches the field pattern. As a result, computational requirements for detecting whether the image signals are in the film mode, can be reduced.

Further, with performing the gradual quantization on the motion information, the resultant value of each quantization is compared with the field pattern in accordance with the 3:2 pull-down conversion. As a result, whether the image signals are in the film mode, can be detected with higher accuracy.

Accordingly, the more accurate IPC method is enabled based on the accurately detected mode of the image signals, and the storage capacity required for the image signals in the film mode can be reduced.

Although the preferred embodiments of the present invention have been described, it will be understood by those skilled in the art that the present invention should not be limited to the described preferred embodiments, but various changes and modifications can be made within the spirit and scope of the present invention as defined by the appended claims and their equivalents.

What is claimed is:

1. An apparatus for detecting whether an image signal is in a film mode, comprising a first field buffer, a second field buffer and a third field buffer that sequentially buffer respective fields of the image signal by order of input, using the respective fields stored in the first, the second and the third field buffers, the apparatus comprising:

a motion information calculator calculating motion information of the respective fields by comparing variations of a motion in the respective fields stored in the first and the third field buffers;

a motion information buffer storing the motion information in unit of a number of the fields; and a pattern matching unit determining whether the image signal is in the film mode by comparing the motion information of the respective fields stored in the unit of the number of fields with a field pattern having a periodicity in accordance with a 3:2 pull-down conversion, and by subsequently determining whether the motion information matches the pattern.

2. The apparatus of claim 1, wherein the motion information calculator calculates the motion information, using one of a calculation of a motion vector of the respective fields stored in the first and the third field buffers, a calculation of a sum of the calculated motion vector, a calculation of a sum of absolute difference (SAD), a calculation of a sum of the calculated SAD, a calculation of a number of motion blocks, and a calculation of a sum of the motion blocks.

3. The apparatus of claim 2, wherein the pattern matching unit performs a gradual quantization on the motion information in which the motion information in the unit of the number of fields is divided by one of gradually increasing numbers, to reduce an external influence on the image signal, compares a resultant value of each quantization with the field pattern in accordance with the 3:2 pull-down conversion, and determines whether the image signal is in the film mode by determining from the comparison result whether the resultant value of the quantization matches the field pattern.

4. The apparatus of claim 3, wherein the gradually increasing numbers used in the gradual quantization are $2^n$ (n=1, 2, 3, ..., m).

5. The apparatus of claim 4, wherein the gradually increasing numbers used in the gradual quantization are $2^n$, with n being 1, 2, 4 and 7 among 1, 2, 3, ..., m.

6. The apparatus of claim 5, wherein the field pattern in accordance with the 3:2 pull-down conversion set to be used in the pattern matching unit comprises:

a pattern in which a motionless field appears in a period of five fields.

7. A method of detecting whether an image signal is in a film mode, using respective fields stored in a first field buffer, a second field buffer and a third field buffer that sequentially buffer the respective fields of the image signal by order of input, the method comprises:

calculating motion information of the respective fields by comparing variations of a motion in the respective fields stored in the first and the third field buffers storing the motion information in unit of a number of fields; and determining whether the image signal is in the film mode by comparing the motion information of the respective fields stored in the unit of the number of fields with a field pattern having a periodicity in accordance with a 3:2 pull-down conversion, and by subsequently determining whether the motion information matches the pattern.

8. The method of claim 7, wherein the calculating of the motion information comprises:

calculating the motion information, using one of a calculation of a motion vector of the respective fields stored in the first and the third field buffers, a calculation of a sum of the calculated motion vector, a calculation of a sum of absolute difference (SAD), a calculation of a sum of the calculated SAD, a calculation of a number of motion blocks, and a calculation of a sum of the motion blocks.

9. The method of claim 8, wherein the determining of the film mode comprises:

performing a gradual quantization on the motion information in which the motion information in the unit of the number of fields is divided by one of gradually increasing numbers, to reduce an external influence on the image signal, compares a resultant value of each quantization with the field pattern in accordance with the 3:2 pull-down conversion, and thereby determines whether the image signal is in the film mode by determining from the comparison result whether the resultant value of the quantization matches the field pattern.

10. The method of claim 9, wherein the gradually increasing numbers used in the gradual quantization are $2^n$ (n=1, 2, 3, ... , m).

11. The method of claim 10, wherein the gradually increasing numbers used in the gradual quantization are $2^n$, with n being 1, 2, 4 and 7 among 1, 2, 3, ... , m.

12. The method of claim 11, wherein the field pattern in accordance with the 3:2 pull-down conversion set to be used in the film mode determining step comprises:

a pattern in which a motionless field appears in the period of five fields.

13. An apparatus for detecting whether an image signal is in a film mode, the apparatus comprising:

a motion information calculator calculating motion information of respective fields by comparing a variation of a motion in the respective fields;

a motion information buffer storing the motion information in unit of a predetermined number of fields; and a pattern matching unit determining whether the image signal is in the film mode by comparing a quantization of the motion information of the respective fields stored in the unit of the predetermined number of fields with a pattern of the field having a predetermined periodicity in accordance with a 3:2 pull-down conversion, and by subsequently determining whether the motion information matches the pattern.

14. The apparatus of claim 13, wherein the motion information calculator calculates the motion information, using one of a calculation of a motion vector of the respective fields stored in the motion information buffers a calculation of a sum of the calculated motion vector, a calculation of a sum of absolute difference (SAD), a calculation of a sum of the calculated SAD, a calculation of a number of motion blocks, and a calculation of a sum of the motion blocks.

15. An apparatus for detecting whether an image signal having a plurality of fields is in a film mode, the apparatus comprising:

a motion information calculator calculating motion information corresponding to respective ones of the fields; and a pattern matching unit comparing a quantization of the motion information with a reference pattern to determine whether the image signal is in the film mode.

16. The apparatus of claim 15, wherein the reference pattern comprises;

patterns formed in the same number as the fields to correspond to the respective motion information.

17. The apparatus of claim 15, wherein the motion information represents that one of the fields is a motionless field, and the pattern matching unit determines that the image signal is not in the film mode, when the motion information matches the reference pattern.

18. The apparatus of claim 15, wherein the motion information represents that one of moving information corresponding to the respective fields repeats in every N fields where N is a positive integer, and the pattern matching unit determines that the image signal is not in the film mode, when the motion information matches the reference pattern.

19. The apparatus of claim 18, wherein the one of the motion information represents a motionless field.

20. The apparatus of claim 18, wherein the N is 5, the one of the motion information represents a motionless field, and the other four of the motion information represent motion fields.

21. The apparatus of claim 18, wherein the pattern matching unit determines that the image signal is in the film mode, when the motion information does not match the reference pattern.

22. The apparatus of claim 18, wherein the reference pattern comprises a pattern indicating a motionless field and a plurality of motion fields, and the pattern matching unit determines that the image signal is in the film mode, when the motion information does not match the reference pattern.

23. The apparatus of claim 22, wherein the pattern matching unit determines that the image signal is not in the film mode, when the motion information matches the reference pattern.

24. The apparatus of claim 15, wherein the motion information calculator compares variations between motions of the fields to calculate the motion information of the fields.

25. The apparatus of claim 15, wherein the reference pattern comprises a periodicity, and the pattern matching unit determines that the image signal is not in the film mode, when the motion information includes the same periodicity as the reference pattern.

26. The apparatus of claim 25, wherein the periodicity represents that one of the motion information is the same as an other one of the motion information.

27. The apparatus of claim 26, wherein the periodicity is generated when the image signal, which is not in film mode, is formed using a 3:2 pull down conversion of a film source image signal of the film mode.

28. The apparatus of claim 26, wherein the one of the fields and the other one of the fields are generated using a 3:2 pull down conversion of a film source image signal in the film mode.

29. The apparatus of claim 15, wherein the motion information comprises:
the number of motion blocks of the respective field.

30. An apparatus for detecting whether an image signal having a plurality of fields is in a film mode, the apparatus comprising:
a motion information calculator calculating motion information corresponding to respective ones of the fields; and
a pattern matching unit comparing the motion information in unit of a number of the fields, and comparing the motion information with a reference pattern to determine whether the image signal is in the film mode;
wherein the pattern matching unit divides the motion information by a positive integer to generate second motion information when the motion information does not match the reference pattern.

31. The apparatus of claim 30, wherein the pattern matching unit compares the second motion information with another reference pattern to determine whether the image signal is in the film mode.

32. The apparatus of claim 30, wherein the positive integer is one of 2, 4, 16, and 128.

33. The apparatus of claim 30, wherein the positive integer is a first integer and a second integer, and the pattern matching unit divides the motion information by the first integer to generate the third information when the second motion information does not match the reference pattern, and compares the third information with another reference pattern to determine whether the image signal is in the film mode.

34. The apparatus of claim 33, wherein the pattern matching unit divides the motion information by the second integer to generate fourth information when the third motion information does not match the reference pattern, and compares the fourth information with another reference pattern to determine whether the image signal is in the film mode.

35. An apparatus for detecting whether an image signal having a plurality of fields is in a film mode, the apparatus comprising:
a motion information calculator calculating motion information corresponding to respective ones of the fields; and
a pattern matching unit comparing the motion information in unit of a number of the fields, and comparing the motion information with a reference pattern to determine whether the image signal is in the film mode;
wherein the motion information comprises a number of motion blocks of the respective field, and
wherein the pattern matching unit divides the number of the motion blocks by a positive integer to generate the second motion information and compare the second motion information with the reference pattern.

36. An apparatus for detecting whether an image signal having a plurality of fields is in a film mode, the apparatus comprising:
a motion information calculator calculating motion information corresponding to respective ones of the fields; and
a pattern matching unit comparing the motion information in unit of a number of the fields, and comparing the motion information with a reference pattern to determine whether the image signal is in the film mode, and
wherein the reference pattern comprises a plurality of addresses each having respective patterns, and the pattern matching unit compares the motion information with one of the respective patterns corresponding to one of the addresses to determine whether the image signal is in the film mode.

37. The apparatus of claim 36, further comprising:
a motion information memory storing the motion information in unit of a number of fields.

38. An apparatus for detecting whether an image signal having a plurality of fields is in a film mode, the apparatus comprising:
a motion information calculator calculating motion information of the respective fields; and
a pattern matching unit comparing a quantization of the motion information corresponding to a group of the fields with a reference pattern to determine whether the image signal is in the film mode.

39. An apparatus for detecting whether an image signal having a plurality of fields is in a film mode, the apparatus comprising:
a motion information calculator calculating first motion information of respective ones of the fields; and
a pattern matching unit dividing the first motion information of the respective fields by a positive integer to generate second motion information, and comparing the second information with a reference pattern to determine whether the image signal is in the film mode.

40. An apparatus for detecting whether an image signal having a plurality of fields is in a film mode, the apparatus comprising:
a motion information calculator calculating motion information in a number of motion blocks of respective ones of the fields; and
a pattern matching unit comparing a quantization of the motion information in the number of motion blocks of the fields with a reference pattern to determine whether the image signal is in the film mode.

41. A method of detecting whether an image signal having a plurality of fields is in a film mode, the method comprising:
calculating motion information of respective ones of the fields;
generating the motion information in unit of a number of the fields; and
comparing the motion information in unit of a number of the fields with a reference pattern to determine whether the image signal is in the film mode, and
wherein the generating of the motion information in unit of the number of the fields and the comparing of the motion information with the reference pattern comprise;
dividing the motion information by a positive integer to generate second motion information; and
comparing the second information with the reference pattern to determine whether the image signal is in the film mode;
wherein the calculating of the motion information comprises: calculating the number of motion blocks.

42. A method of detecting whether an image signal having a plurality of fields is in a film mode, the method comprising:
calculating motion information of respective ones of the fields;
generating the motion information in unit of a number of the fields; and comparing the motion information in unit of a number of the fields with a reference pattern to determine whether the image signal is in the film mode, and wherein the generating of the motion information in unit of the number of the fields and the comparing of the motion information with the reference pattern comprise:

dividing the motion information by a positive integer to generate second motion information; and comparing the second information with the reference pattern to determine whether the image signal is in the film mode.

* * * * *

UNITED STATES PATENT AND TRADEMARK OFFICE
CERTIFICATE OF CORRECTION

| | |
|---|---|
| PATENT NO. | : 7,233,361 B2 |
| APPLICATION NO. | : 10/438210 |
| DATED | : June 19, 2007 |
| INVENTOR(S) | : Seung-joon Yang et al. |

Page 1 of 1

It is certified that error appears in the above-identified patent and that said Letters Patent is hereby corrected as shown below:

Column 13, Line 5, change "buffers" to --buffers;--.

Column 16, Line 49-50, change "comprise;" to --comprise:--.

Signed and Sealed this

Thirtieth Day of October, 2007

JON W. DUDAS
*Director of the United States Patent and Trademark Office*